June 16, 1931. A. BOCHNAK 1,810,550
AEROPLANE SAFETY LANDING DEVICE
Filed Sept. 18, 1930 3 Sheets-Sheet 1
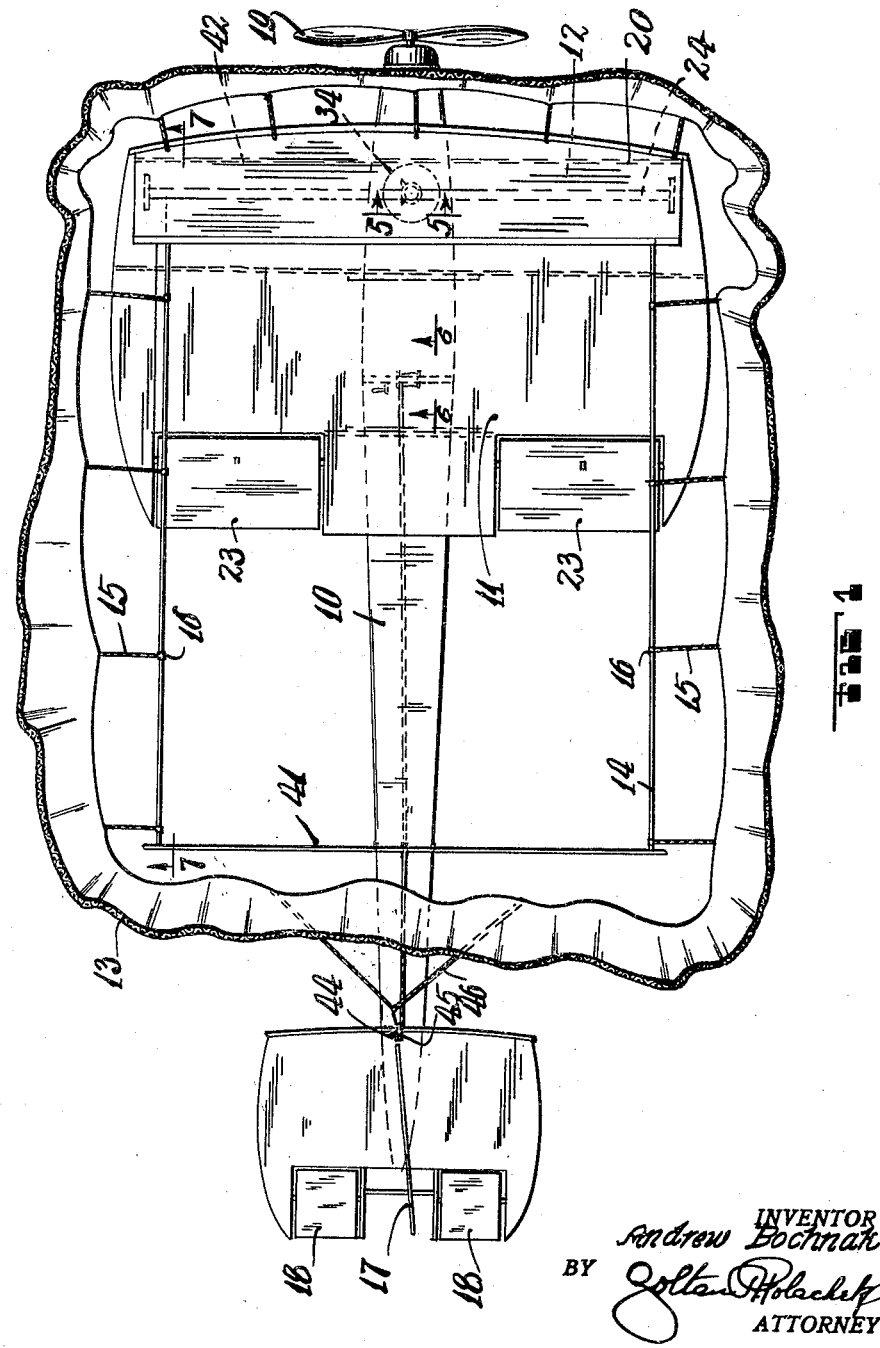

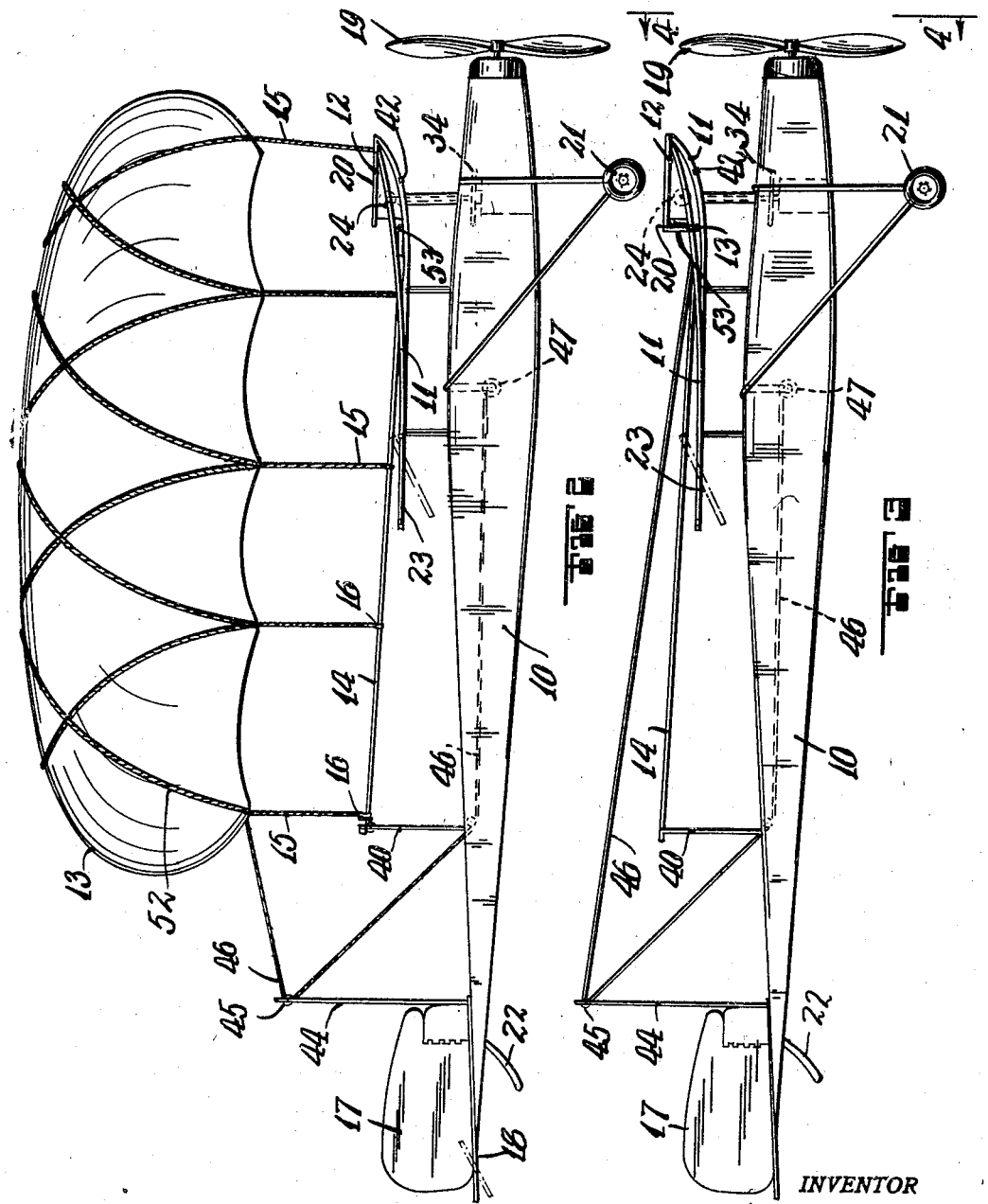

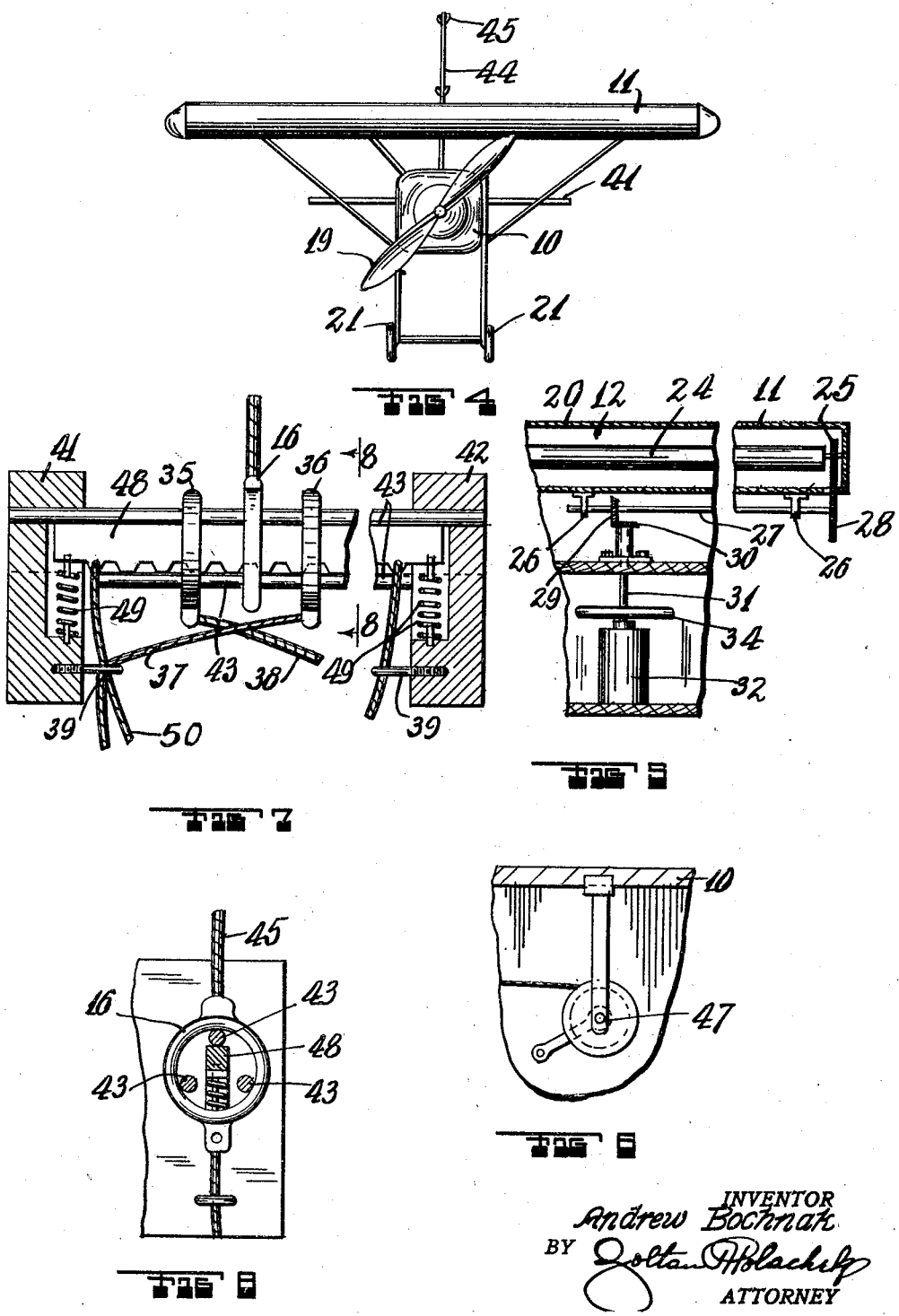

Patented June 16, 1931

1,810,550

UNITED STATES PATENT OFFICE

ANDREW BOCHNAK, OF BOBTOWN, PENNSYLVANIA

AEROPLANE SAFETY LANDING DEVICE

Application filed September 18, 1930. Serial No. 482,737.

This invention relates to new and useful improvements in an aeroplane safety landing device.

The invention has for an object the provision of a device of the class mentioned which is of simple durable construction, dependable in use and efficient in action, and which can be manufactured and sold at a reasonable cost.

The invention proposes in combination with an aeroplane having wings, a pocket on said wings and having its opening facing rearwards, means in said pocket for folding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a plan view of an aeroplane equipped with a device constructed according to this invention with the top part of the parachute cut away in order that details may be seen.

Fig. 2 is a side sectional view of Fig. 1.

Fig. 3 is a side view of Fig. 2, but showing the parachute in a folded position.

Fig. 4 is a front view taken on the line 4—4 of Fig. 3.

Fig. 5 is a fragmentary detailed view taken on the line 5—5 of Fig. 1.

Fig. 6 is an enlarged fragmentary detailed view taken on the line 6—6 of Fig. 1.

Fig. 7 is an enlarged fragmentary view taken on the line 7—7 of Fig. 1.

Fig. 8 is a fragmentary view taken on the line 8—8 of Fig. 7.

The aeroplane safety landing device is illustrated in combination with an aeroplane 10 having wings 11, a pocket 12 on said wings and having its opening facing rearwards, a door 53 closing the opening of the said pocket, means in said pocket 12 for folding a parachute sail 13, a frame on said aeroplane 10 and including side-forming elements 14 extending from said pocket 12 rearwards, a parachute sail 13 with a plurality of support cords 15 attached along its edges, reinforcement ropes 52 arranged crossways around the parachute sail 13 to insure sufficient strength for the sail 13 for safely supporting the aeroplane, rings 16 on the free ends of said cords 15 and slidably engaged on said side-forming elements 14, means for drawing said parachute 13 from said pocket 12 and into operative position, and means for clamping said rings 16 in stationary positions along said side-forming elements 14 for holding the parachute in the operative position.

The areoplane 10 is of any conventional design, and as illustrated is a monoplane. Upon the fuselage, wings 11 are fixed in a position at right angles to the fuselage. At the rear end of the fuselage a tail consisting of a rudder 17 and elevators 18 is attached, while at the front a conventional motor and propeller 19 is connected. At the bottom of the front portion of the fuselage a landing gear 21 is secured, and at the rear portion under the tail a tail skee 22 projects. The front edge of wings 11 curve upward and from the highest point a partition 20 extends rearward to form said pocket 12. The pocket 12 extends along the entire front edge of the wings, while the rear edge of the wings are equipped with ailerons 23.

The means in the said pocket 12 for folding a parachute sail 13 comprises a roller 24 stretched in full length across the pocket 12 from wing tip to wing tip. A gear 25 is secured to the roller. Blocks 26 mounted just below the roller rotatively holds shaft 27. Secured to shaft 27 is gear 28 which meshes with gear 25. A bevel gear 29 is fixed upon the shaft 27 and engages with another bevel gear 30 which is fixed upon a vertical shaft 31. The vertical shaft 31 is rotative in block 32. A wheel 34 situated in the vicinity of the pilot is secured to the shaft 31 for easy manipulation of the said shaft. Upon rotation of wheel 34, shaft 31 rotates bevel gear 30 which rotates gear 39, revolving the shaft 27, and causing the roller 24 to revolve because of gears 28 and 25. The door 53 is hinged along the bottom of the opening of the pocket and is normally kept closed by a conventional catch, not shown on the drawing, when the parachute is in the pocket and thereby prevents it from being pulled out by the wind.

The most rearward wing 16 has two idler rings 35 and 36 on both sides of it. Cables 37 and 38 are attached respectively to these idler rings. The cable attached to idler rings 36, which is the one on the side of ring 16 nearest the pocket 12, runs in a rearward direction and then passes through an eyelet 39 and subsequent idlers not shown on the drawing to the vicinity of the pilot. The cable 38, which is secured to the idler 35, runs directly to the vicinity of the pilot. When cable 37 is drawn ring 16 is pulled rearward and the parachute is extended, while when cable 38 is drawn the ring 16 is drawn towards the pocket.

The frame before mentioned consists of rear vertical rods 40 attached at right angles to the fuselage. A rear transversal rod 41 connects the rear vertical rods 40. A front transversal rod 42 is secured within the pocket 12. Said side-forming elements 14 connect the front transversal rod with the rear transversal rod. The side-forming elements 14 are each comprised of three rods 43 which are arranged in a triangular manner. The three rods are spaced between the front and rear transversal rods.

The cords 15 support the parachute sail 13 by connecting onto rings 16 which are slidably engaged upon the side-forming elements 14. All the cords 15 on one side of the parachute sail 13 connect with rings on the side-forming elements 14 which are on the same side. Those cords which are on the other side of the parachute connect with corresponding rings on its side. The means for drawing said parachute from said pocket and into an operative position comprises a vertical mast 44 projecting at right angles to the fuselage at its tail. A pulley 45 is connected to the top of the mast. A cable 46 connects to the rear portion of the parachute sail, leaves the pocket 12 by means of a notch in the door 53, said notch not shown in the drawing, and passes over the pulley 45, and guided by idlers reaches the pilot's cabin and there is attached to a conventional windlass 47. Upon operation of the windlass, cable 46 is drawn taut, and the parachute sail 13 is dragged out of the pocket 12. Also, cable 37 is drawn, and idler ring 36 drawing against rings 16 pull the parachute from the pocket.

The means for clamping said rings 16 in stationary positions along said side-forming elements 14 comprises a rack 48 slidably mounted between the front and rear transverse sections of the frame and also in the center of the three rods 43. Springs 49 tend to urge the rack 48 continually upward against the uppermost rod 43. Cables 50 are secured to the rack 48 and are led through the eyelets 39 downward, and then through idlers not shown on the drawing into the pilot's cabin. Upon pulling the cables 50, the rack 48 is drawn downwards and the teeth of the rack engage the rings 16 and hold them in a clamped position.

In operation of the device, the parachute may be brought into an operative position by operating the windlass 47 and by pulling the cable 37. The windlass 47 draws the cable 46 which passes around the pulley 45 and then attaches to the parachute sail 13, thereby forcing the door 53 open and drawing the parachute from the pocket. The cable 37 pulls the rings 16 rearward along the side-forming elements 14. The cables 50 may then be drawn, pulling the rack 48 downward and clamping all the rings 16 in a locked position. Upon wishing to fold the parachute sail 13 back into the pocket 12, the wheel 34 is turned. Through gear connections the roller 24 revolves and the parachute is wound upon it. Cable 38 is also drawn, pulling the rings 16 into the pocket.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patents is:—

1. In combination with an aeroplane having wings, a pocket on said wings and having its opening facing rearwards, means in said pocket for folding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position.

2. In combination with an aeroplane having wings, a pocket on said wings and having its opening facing rearwards, means in said pocket for folding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position, said pocket being formed by an upward tilt of the front edge of the said wings, and a partition extending rearwards connected to the edge of the said wings.

3. In combination with an aeroplane having wings, a pocket on said wings and having its opening facing rearwards, means in said pocket for folding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position, said means for folding the parachute sail comprises a roller rotatively mounted within said pocket, and means for rotating said roller.

4. In combination with an aeroplane having wings, a pocket on said wings and having its opening facing rearwards, means in said pocket for folding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position, said means for folding the parachute sail comprises a roller rotatively mounted within said pocket, and means for rotating said roller, comprising a gear system connected to a shaft, and a wheel connected to said shaft.

5. In combination with an aeroplane having wings, a pocket on said wings and having its opening facing rearwards, means in said pocket for folding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position, said means for folding the parachute sail comprises a support ring attached to the parachute sail, an idler ring on the rear side of said support ring, a cable attached to said idler ring, and idler wheels for conducting said cable to the vicinity of the pilot.

6. In combination with an aeroplane having wings, a pocket on said wings and having its opening facing rearwards, means in said pocket for holding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position, said frame comprising rear vertical rods projecting from the rear end of the aeroplane, a rear transversal rod joining the upper ends of the said rear vertical rods, a front transversal rod secured within said pocket, and side-forming elements joining the rear and front transversal rods.

7. In combination with an aeroplane having wings, a pocket on said wings and having its opening facing rearwards, means in said pocket for folding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position, said frame comprising rear vertical rods projecting from the rear end of the aeroplane, a rear transversal rod joining the upper ends of the said rear vertical rods, a front transversal rod secured within said pocket, and side-forming elements joining the rear and front transversal rods, said side-forming elements comprising three rods arranged in a triangular manner and secured between the front and rear transversal rods.

8. In combination with an aeroplane having wings, a pocket on said wings and having its opening facing rearwards, means in said pocket for folding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position, said means for drawing said parachute from said pocket and into an operative position comprises a vertical mast with a pulley attached at the uppermost end secured to the tail end of the fuselage, a windlass situated in the vicinity of the pilot, and a cable attached between the parachute sail and the windlass around the said pulley of the vertical mast.

9. In combination with an aeroplane having wings, a pocket on said wings and having its opening facing rearwards, means in said pocket for folding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position, said means for drawing said parachute from said pocket and into an operative position comprises a ring secured to the said parachute and slidably engaged on the said side-forming elements on the side of said ring nearest the pocket, a cable attached to the said idler ring, an eyelet secured in the rear of the said frame, said cable passing through said eyelet, and idler pulleys arranged for conducting the said cable into the vicinity of the pilot.

10. In combination with an aeroplane having wings, a pocket on said wings and having its opening facing rearwards, means in said pocket for folding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position, comprising a rack extending through the center of the said side-forming elements and slidably mounted in the said frame, means for urging said rack upward against the top portion of said side-forming elements, cables attached to said rack, eyelets secured in the frame for engaging said cables and leading them downward, and idler pulleys arranged for conducting said cables to the vicinity of the pilot.

11. In combination with an aeroplane having wings, a pocket on said wings and having its opening facing rearwards, means in said pocket for folding a parachute sail, a frame on said aeroplane and including side-forming elements extending from said pocket rearwards, a parachute sail with a plurality of support cords attached along its edges, rings on the free ends of said cords and slidably engaged on said side-forming elements, means for drawing said parachute from said pocket and into operative position, and means for clamping said rings in stationary positions along said side-forming elements for holding the parachute in the operative position, comprising a rack extending through the center of the said side-forming elements and slidably mounted in the said frame, a spring for urging said rack upward against the top portion of said side-forming elements, cables attached to said rack, eyelets secured in the frame for engaging said cables and leading them downward and idler pulleys arranged for conducting said cables to the vicinity of the pilot.

In testimony whereof I have affixed my signature.

ANDREW BOCHNAK.